Oct. 1, 1940.  J. F. P. FARRAR  2,216,468
METHOD OF MAKING A COUPLING CONNECTION
Filed April 6, 1938   2 Sheets-Sheet 1
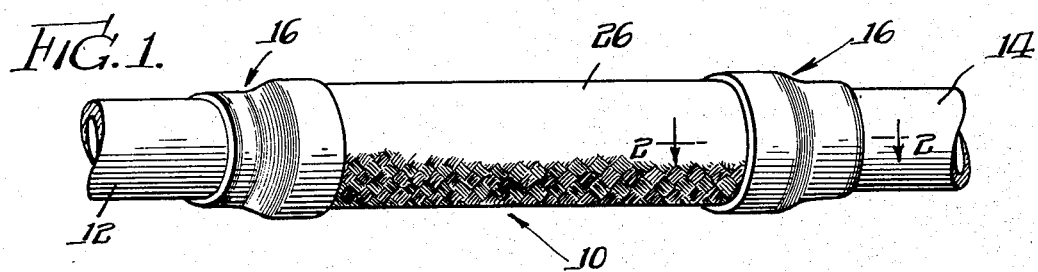
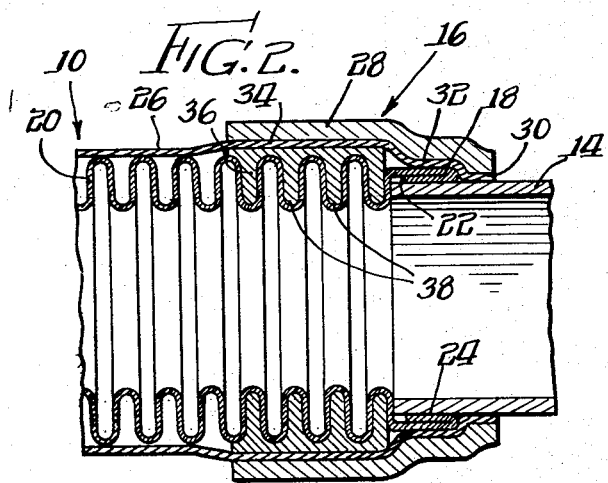
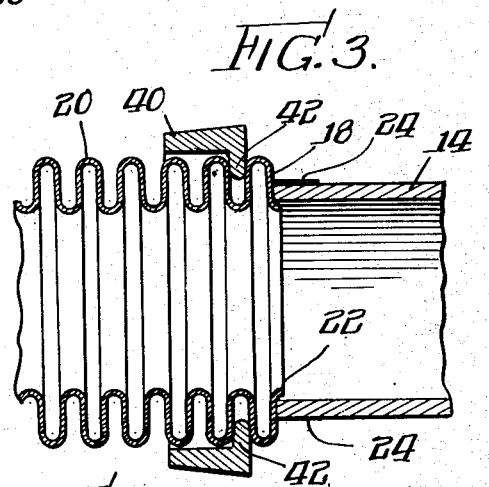
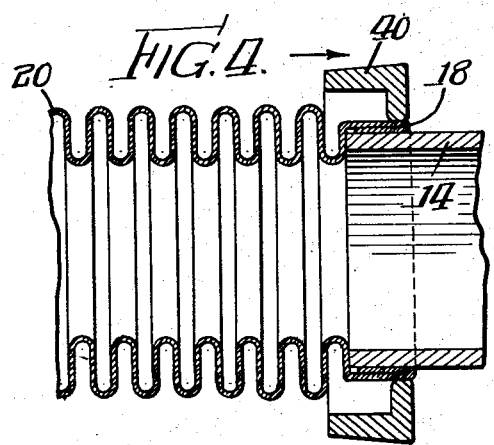
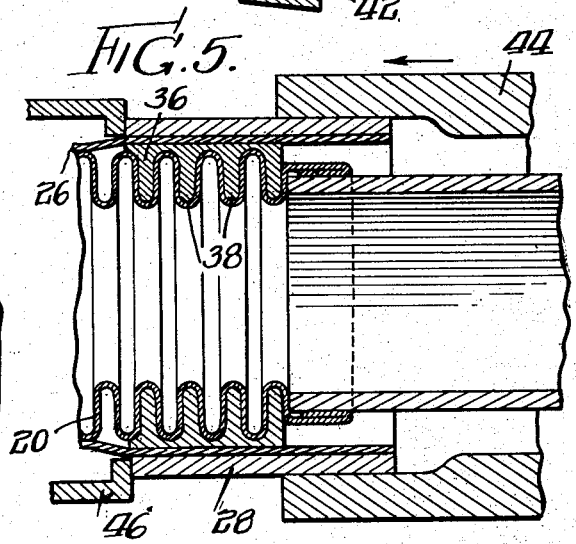
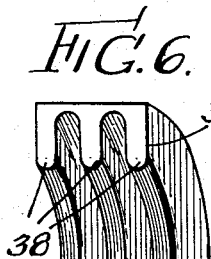
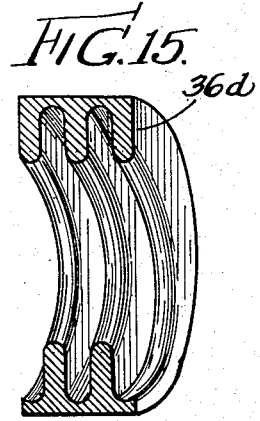
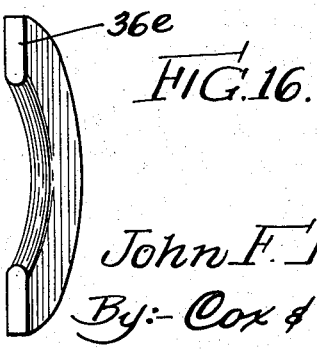
INVENTOR.
John F. P. Farrar
By:- Cox & Moore
ATTORNEYS.

Oct. 1, 1940.  J. F. P. FARRAR  2,216,468
METHOD OF MAKING A COUPLING CONNECTION
Filed April 6, 1938  2 Sheets-Sheet 2
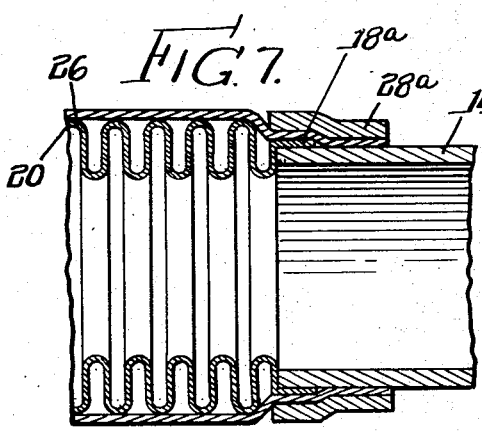
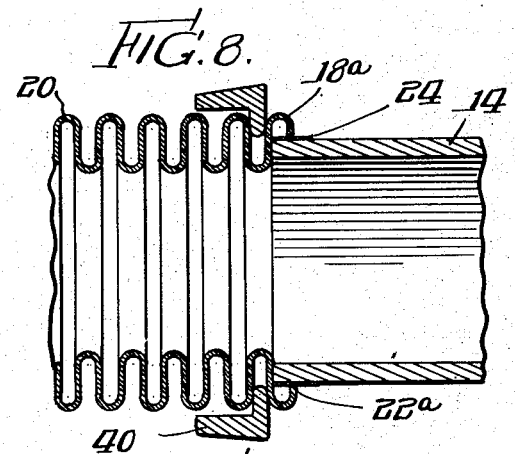
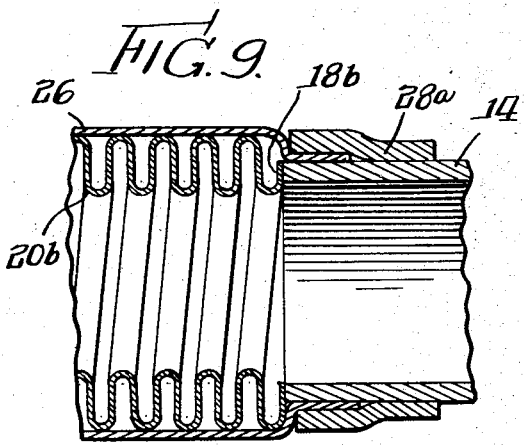
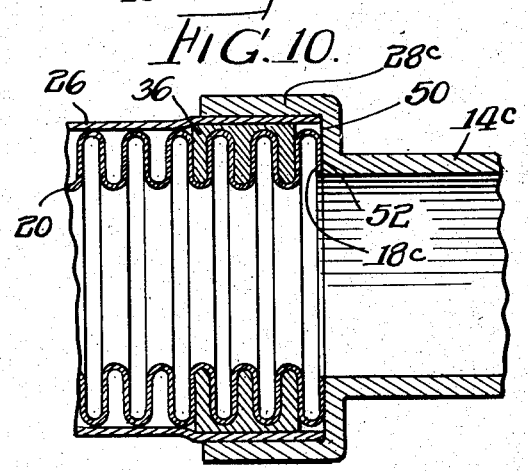
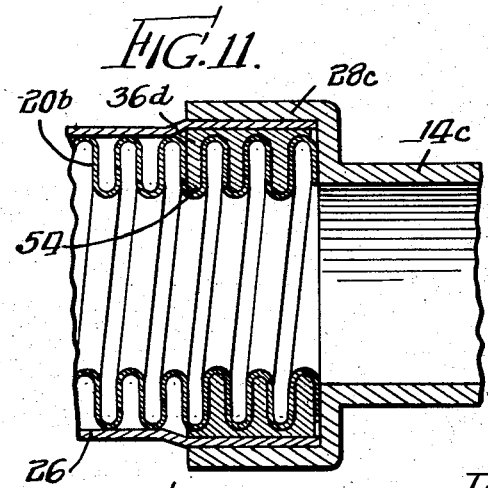
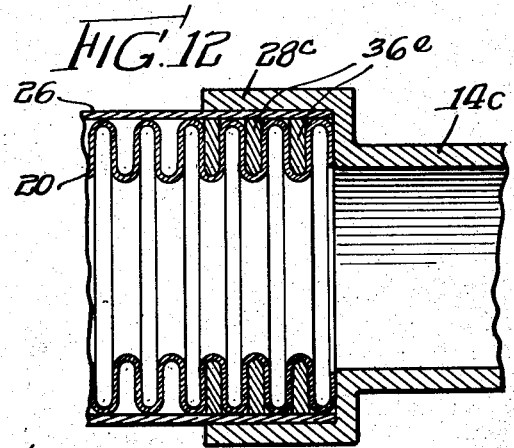
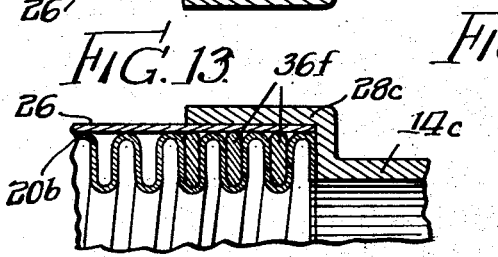
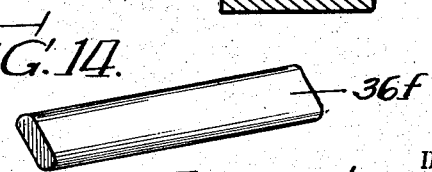
INVENTOR.
John F. P. Farrar
BY:- Cox & Moore
ATTORNEYS Patented Oct. 1, 1940

2,216,468

UNITED STATES PATENT OFFICE 2,216,468

METHOD OF MAKING A COUPLING CONNECTION

John F. P. Farrar, Barrington, Ill., assignor to Chicago Metal Hose Corporation, Maywood, Ill., a corporation of Illinois Application April 6, 1938, Serial No. 200,368

5 Claims. (Cl. 29—157)

This invention relates to coupling constructions, and more particularly to a coupling connection of the brazed or soldered type adapted for use with flexible metal tubing.

It is an object of the invention to provide an improved coupling construction of the brazed or soldered type for flexible metal hose or tubing which may be readily and cheaply produced, which provides a strong and fluid-tight connection, and which will be wholly reliable and durable in service. More specifically it is an object of the invention to provide a connection of the type set forth which is of simplified construction, which requires a minimum of skill to produce a reliable and strong fluid-tight joint, and which can be readily produced with a suitable heating unit such as a controlled atmosphere electric furnace or the like.

Other objects of the invention are to provide a coupling construction of the type set forth wherein the braid for the tubing and the braid ends are positively and mechanically held in position, brazing or soldering providing additional securing means for the braid, if desired, and wherein additional securing means may be provided in interlocking engagement with the convolutions of the flexible tubing to insure the production of a rugged and durable construction.

Still other objects and advantages of the invention will appear from the following description when taken in connection with the accompanying drawings wherein certain preferred embodiments of the invention are illustrated.

In the drawings, wherein like reference numerals refer to like parts throughout:

Fig. 1 is a general view illustrating coupling connections constructed in accordance with one form of the invention as applied to a vibration absorbing fitting or the like for pipe lines or conduits.

Fig. 2 is a longitudinal sectional view through one of the coupling connections in Fig. 1 on the line 2—2 thereof.

Figs. 3, 4 and 5 are views illustrating the successive method steps employed in fabricating the coupling connection of Fig. 2.

Fig. 6 is a detail perspective view of one of the interlocking devices used in this form of construction.

Fig. 7 is a view similar to Fig. 2, but illustrating a modified form of construction.

Fig. 8 is a view illustrating the method of forming the coupling connection of Fig. 7.

Fig. 9 illustrates a form of construction generally similar to that shown in Fig. 7, but applied to helical rather than annular corrugated tubing.

Figs. 10, 11, 12 and 13 illustrate further modifications showing various forms of tubing interlocking devices, Figs. 10 and 12 showing coupling connections for annular corrugated tubing, and Figs. 11 and 13 showing connections for helical corrugated tubing.

Fig. 14 is a detailed partial perspective showing the form of interlocking device or wire used in the Fig. 13 construction, Fig. 15 shows one of the interlocking pieces used in the Fig. 11 construction, and Fig. 16 shows the form of interlocking piece used in the Fig. 12 construction.

Referring specifically to the drawings, in Fig. 1 there is illustrated a vibration absorber or fitting comprising a piece of flexible metal hose or tubing 10 arranged in a pipe line or conduit 12—14. The ends of the flexible metal tubing are secured to the pipe line by coupling connections indicated generally by the reference numeral 16. Vibration absorbing fittings are interposed in pipe lines or conduits for the purpose of absorbing or damping vibration or noise. One end of the pipe line may, for example, be connected to a compressor or pump which sets up vibrations in the piping. The vibration absorber is inserted in the pipe line to absorb these vibrations and prevent transmittal of them along the conduit. Frequently the pipe line carries a "searching" fluid under considerable pressure, and due to the vibration in the line it is essential that the coupling connections for the vibration absorber fittings be of rugged and durable character which will withstand and prevent leakage of the fluids under pressure even when subjected to considerable vibration over long periods of service. The coupling connections of the present invention are well adapted for this service, but it is to be understood that they are also of more general utility and may be used in various types of installations wherein a piece of flexible metal tubing or hose is to be secured to a coupling piece or member.

The coupling connection shown in Fig. 1, and the method of making it, are illustrated in detail in Figs. 2 to 6 inclusive. Referring to Fig. 2, it will be seen that the end 18 of the flexible metal tubing 20, which in this instance is of the annular corrugated type, is formed into a cylindrical sleeve embracing and secured to the end of the pipe 14. It is to be understood that the pipe 14 may be any form of coupling piece. For example, it might be threaded at its end which projects away from the flexible tubing for connection with any other suitable coupling piece, and hence may be generically termed a coupling member. The tube end 18 is of double thickness, the extreme end 22 of the tubing being folded underneath the adjacent tubing portions. The tubing end is secured to the pipe or coupling member by brazing or soldering material at the line of juncture between the parts, as indicated by the reference numeral 24. The tubing braid 26, which may preferably be the usual metal braid provided in flexible tubing of the character described or any other suitable covering member, is secured in place by the braid sleeve 28 which clamps the extreme end 30 of the braid against the pipe 14, and the intermediate portions 32 and 34 of the braid against the tubing end 18 and an interlocking device 36, respectively. The interlocking device comprises a pair of semi-cylindrical parts, one of which is illustrated in Fig. 6. It is provided with a series of inwardly extending annular projections 38 adapted for interlocking engagement with the annular corrugations of the tubing, and with a cylindrical exterior surface adapted for engagement with the braid portion 34. The projections 38 of the interlocking device may be brazed or soldered to the tubing convolutions, if desired, and the braid may be similarly secured by brazing or soldering exteriorly to the sleeve 28 and interiorly to the interlocking device, the tubing end 18, and the pipe 14, if desired, or the braid and interlocking device may be merely held in place mechanically by the sleeve 28.

In fabricating the coupling connection, referring to Figs. 3, 4 and 5, the flexible metal tubing is first cut at 22, Fig. 3, and the end 18 brought into abutting engagement against the pipe 14 to which the tubing is to be secured. The cutting of the tubing at the point 22 may be readily carried out, as this point is at the base of one of the troughs of the annular corrugations. A die 40 which may comprise a pair of separable semi-circular members provided with inwardly projecting flanges 42 forming a complete circumferential flange when the die members are brought together is then engaged with the tubing so that the inwardly projecting flange 42 engages the tubing convolution which is adjacent the tubing end 18. The die is then moved to the right with respect to the tubing, as indicated in Fig. 4, whereby to bring the tubing end 18 into embracing engagement with the end of the pipe, suitable brazing or soldering material, which may be in the form of a ribbon or powder, having been first arranged upon the pipe as indicated at 24, Fig. 3.

The interlocking device 36 is then arranged upon the tubing, as shown in Fig. 5, with its inwardly extending projections 38 in engagement with the annular corrugations of the tubing. In view of the fact that the interlocking device comprises a pair of separable semi-cylindrical elements, Fig. 6, the device may be readily mounted on the tubing. If it is desired to braze or solder the interlocking device in position upon the tubing, suitable brazing or soldering material is first placed upon the tubing convolutions before the interlocking device is assembled thereon. The braid 26 and the braid sleeve 28 are then slipped over the assembly after which the braid sleeve is compressed or deformed inwardly into tight gripping engagement with the parts by any suitable means as, for example, by an axially movable split die member 44, the braid sleeve being prevented from axial movement during this deforming operation by the split die 46. If it is desired to secure the braid in position by brazing or soldering, in addition to its mechanical retention by the braid sleeve, suitable brazing or soldering material is applied exteriorly and interiorly of the braid prior to the braid sleeve deforming operation.

After the parts are thus assembled, the entire construction may be introduced into a controlled atmosphere electric furnace and brought up to brazing or soldering heat whereby to effectively and securely braze or solder the parts together. While such a furnace provides a very satisfactory heating means and may be preferably used, it is to be understood that any other suitable means such, for example, as a brazing torch may be used to heat the parts to brazing temperature. In instances wherein only the tube end 18 and the pipe 14 are to be brazed or soldered together, the other parts being secured merely by the mechanical gripping action of the braid sleeve, the heating operation may be carried out after the tubing end has been assembled upon the pipe, as shown in Fig. 4, and prior to the assembling of the interlocking device, braid, and braid sleeve. It is also to be understood that while the brazing or soldering material may be preferably applied to the parts during their assembly in the manner hereinbefore set forth, it is also possible in some instances to apply the brazing or soldering material exteriorly of the construction during the heating operation, permitting the material to be drawn between the surfaces to be brazed or soldered by gravity flow or capillary action.

It will be seen that the coupling construction can be readily fabricated and assembled in accordance with the foregoing method with a minimum of effort and with a minimum of operations requiring skilled labor. The brazing or soldering operations can be carried out merely by introducing the entire construction into an electric furnace or like heating means, it being unnecessary to braze or solder the parts with a brazing rod and torch, an operation requiring considerable time and skilled effort, and frequently leading to unsatisfactory results. The brazing operations in accordance with the present invention preclude the formation of any pin-holes or other imperfections in the brazed or soldered connections. The interlocking device 36 provides a positive interlocking connection with the convolutions of the tubing, and the braid sleeve provide san effective means for positively gripping the braid, including the extreme end of the braid, in position. The mechanical gripping of the braid greatly increases the strength of the construction over that which it would have were the braid merely brazed or secured in position, and the braid sleeve also prevents any fraying at the extreme end 30 of the braid. The brazed or soldered connection between the end 18 of the tubing and the pipe 14 insures a fluid-tight joint, and this joint is enforced by the embracing braid sleeve. A rugged and durable fluid-tight joint is insured even under fluid pressures and extended vibration conditions.

In Fig. 7 there is illustrated a construction in which the end of the tubing 18a embraces and is secured to the pipe or coupling member 14, in a manner similar to that described in connection with Fig. 2, but wherein the interlocking device engageable with the convolutions of the tubing is omitted and the braid sleeve 28a extends only to the end of the coupling member 14 and does not extend along the tubing convolutions. Also in this instance the end 18a of the tubing is illustrated as being of single thickness.

The method of producing the coupling of Fig. 7, insofar as it differs from that previously described, is shown in Fig. 8 wherein it will be seen that the tubing is cut at a point 22a midway of one of the tubing corrugations rather than at the base thereof. The tubing end is brought into engagement with the pipe 14 by a die 40, and secured thereon by brazing or soldering, and the braid sleeve 28a is secured in position, in the manner previously described.

In Fig. 9 a construction is illustrated, substantially similar to Fig. 7, except that the end 18b of the tubing is brazed or soldered as indicated at 48 to the vertical end face of the pipe or coupling member 14. In this instance the tubing 20b is illustrated as being of the helical corrugated type.

In Fig. 10 a form of construction is illustrated wherein the pipe or coupling member 14c is provided with an end portion 28c forming a braid sleeve, this portion being adapted to be contracted or deformed into gripping engagement with the braid 26 as in the case of the braid sleeves previously described. An interlocking device 36, as in the embodiment of the invention illustrated in Fig. 2, is provided between the braid and the tubing convolutions. The end 18c of the tubing is brazed or soldered to the vertical face 50 of the coupling member, as indicated at 52.

Figs. 11, 12 and 13 illustrate constructions substantially similar to that shown in Fig. 10, except that in each instance a different form of interlocking device is employed. Thus in Fig. 11 the tubing 20b is helically corrugated, and the interlocking device 36d may comprise a one-piece annular collar provided with a continuous depending flange or thread 54 helically formed for coaction with the helical grooves of the tubing. This interlocking device is shown in section in Fig. 15. In Fig. 12 the tubing 20 is annularly corrugated and the interlocking device comprises a series of individual annular collars 36e adapted to engage the tubing convolutions. Each of the collars is made in two separable parts, one of which is shown in Fig. 16, so that the collars can be readily applied to the annular corrugations of the tubing. In Fig. 13 the tubing 20b is helically corrugated and the interlocking device 36f comprises a continuous wire, a portion of which is shown in Fig. 14, which is wound along the helical convolutions of the tubing.

In each of the embodiments of the invention illustrated in Figs. 7 to 16 inclusive, the tubing braid may be merely mechanically retained in position by the gripping action of the contracted braid sleeve, or brazing or soldering material may be applied between the braid and the braid sleeve, between the braid and the tubing or interlocking device, and between the interlocking device and the tubing convolutions whereby to produce a unitary brazed or soldered construction. In each instance the end of the tubing is brazed or soldered to the coupling member to produce a fluid-tight joint.

Various changes may be made in the embodiments of the invention specifically set forth for purposes of illustration, without departing from the spirit of the invention. Accordingly the inventoin is not to be limited to the precise embodiments shown, or to the precise method steps illustrated and described, but only as indicated in the following claims.

The invention is hereby claimed as follows:

1. The method of making a coupling connection which comprises abutting the end of a piece of corrugated metal tubing against a cylindrical coupling member with the crest portion of the end tubing convolution projecting radially outwardly beyond the outer cylindrical surface of the coupling member, and applying pressure in a direction parallel to the axis of the tubing against substantially the entire circumferential surface of the projecting portion of the end corrugation to collapse said corrugation and bend the same by a wiping action over the end of said coupling member and into engagement therewith.

2. The method of making a coupling connection which comprises abutting the end of a piece of corrugated metal tubing against a cylindrical coupling member with the crest portion of the end tubing convolution projecting radially outwardly beyond the outer cylindrical surface of the coupling member, applying pressure in a direction parallel to the axis of the tubing against substantially the entire circumferential surface of the projecting portion of the end corrugation to collapse said corrugation and bend the same by a wiping action over the end of said coupling member and into engagement therewith, and soldering the cylindrical tubing extension thus formed to the engaged surface of the coupling member whereby to form a fluid-tight connection between the coupling member and the tubing end.

3. The method of making a coupling connection which comprises abutting the end of a piece of corrugated metal tubing against a cylindrical coupling member with the crest portion of the end tubing convolution projecting radially outwardly beyond the outer cylindrical surface of the coupling member, applying pressure in a direction parallel to the axis of the tubing against substantially the entire circumferential surface of the projecting portion of the end corrugation to collapse said corrugation and bend the same by a wiping action over the end of said coupling member and into engagement therewith, and arranging a sleeve member around the cylindrical tubing extension thus formed and in tight gripping engagement therewith.

4. The method of making a coupling connection which comprises abutting the end of a piece of corrugated metal tubing against a cylindrical coupling member with the crest portion of the end tubing convolution projecting radially outwardly beyond the outer cylindrical surface of the coupling member, applying pressure in a direction parallel to the axis of the tubing against substantially the entire circumferential surface of the projecting portion of the end corrugation to collapse said corrugation and bend the same by a wiping action over the end of said coupling member and into engagement therewith, arranging a metallic braid around the corrugated tubing and the cylindrical extension thereof formed by the said application of pressure to the end corrugation, and thereafter securing a braid sleeve member in tight embracing relation around said braid to clamp the braid into tight gripping engagement with the cylindrical tubing extension.

5. The method of making a coupling connection which comprises abutting the end of a piece of corrugated metal tubing against a cylindrical coupling member with the crest portion of the end tubing convolution projecting radially outwardly beyond the outer cylindrical surface of the coupling member, applying pressure in a direction parallel to the axis of the tubing against substantially the entire circumferential surface of the projecting portion of the end corrugation to collapse said corrugation and bend the same by a wiping action over the end of said coupling member and into engagement therewith, arranging an interlocking member within the convolutions of the tubing adjacent the tubing end, arranging a metallic braid around the interlocking member and the cylindrical tubing extension formed by the said application of pressure to the end corrugation of the tubing, and securing a braid sleeve in tight embracing engagement with the braid to clamp the braid into engagement with the interlocking member and the cylindrical tubing extension.

JOHN F. P. FARRAR.